June 4, 1968   I. D. JOHNSON ET AL   3,387,198
REMOTE TRANSDUCER BATTERY CHARGING CIRCUIT
Filed March 17, 1966
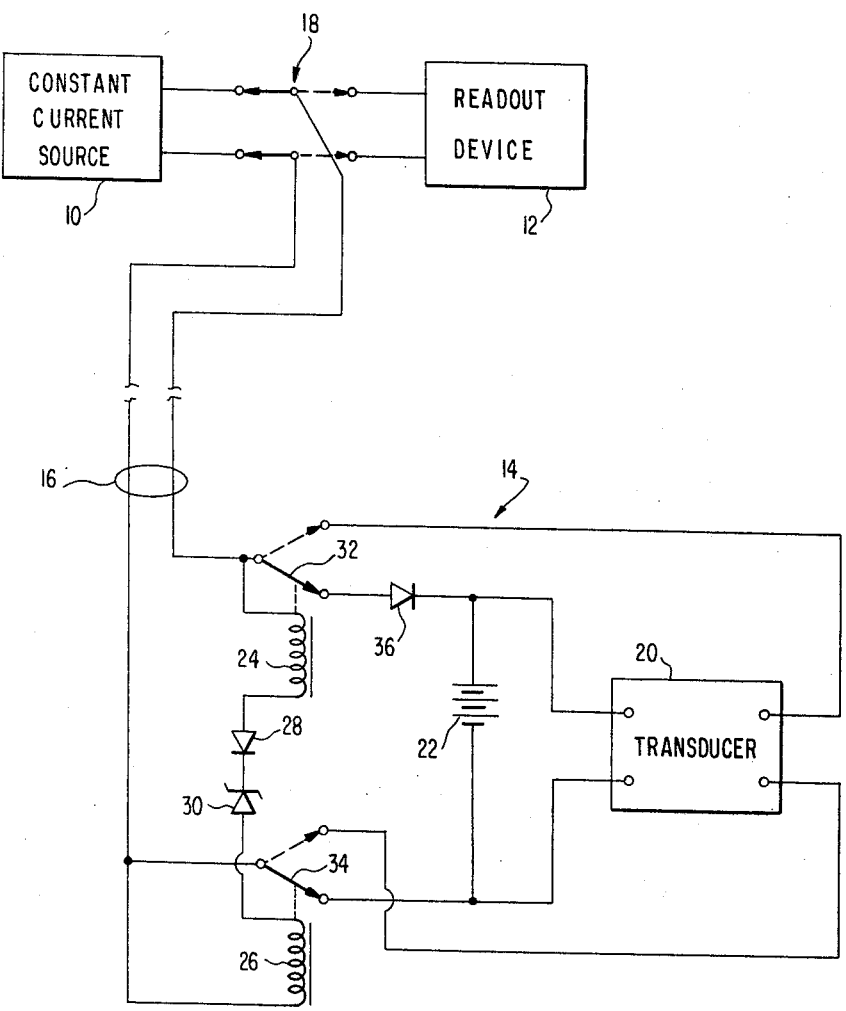
INVENTORS
IRVIN D. JOHNSON
CHARLES R. BRUCE
BY *Sughrue, Rothwell, Mion,*
*Zinn & Macpeak*
ATTORNEYS United States Patent Office 3,387,198
Patented June 4, 1968

3,387,198
REMOTE TRANSDUCER BATTERY
CHARGING CIRCUIT
Irvin D. Johnson and Charles R. Bruce, Littleton, Colo.,
assignors to Marathon Oil Company, Findlay, Ohio, a
corporation of Ohio
Filed Mar. 17, 1966, Ser. No. 535,083
3 Claims. (Cl. 320—14)

ABSTRACT OF THE DISCLOSURE

A charging circuit for a remote battery energizing an in situ bore hole transducer. A two wire cable is connected at the surface to either a charging current source or a readout device by a first switch. The lower end of the cable is connected to either the battery or the transducer output by a second, relay controlled switch. When the first switch connects the surface end of the cable to the source, the relay is energized and actuates the second switch to connect the lower end of the cable to the battery to charge same. Conversely, when the first switch connects the upper end of the cable to the readout device the relay is de-energized and the second switch connects the lower end of the cable to the transducer.

This invention relates in general to a remote metering apparatus, and more particularly to a novel charging-readout circuit arrangement for a remote, battery powered transducer, such as is employed in bore hole measuring.

In the remote metering art, as applied to environments where electrical power is unavailable, it is desirable, for purposes of operational stability, accuracy and circuit simplicity, to employ self-powered transducer or sensing units. On the other hand, the use of storage batteries to satisfy this requirement introduces a further limitation in that the in situ life of the unit is governed by he useful life of the battery, unless it can be remotely charged. The latter expedient normally requires a four conductor cable with one pair of conductors connected in the charging circuit and the other pair connected in the readout circuit. This is not only costly in terms of the cable expense when the distance from the transducer unit to the charging and monitoring means is great, but adds appreciably to the weight of the apparatus.

It is therefore a primary object of this invention to provide a combination battery charging and readout circuit for a self-powered remote metering device which employs a single two conductor cable to implement both functions.

It is a further object of this invention to provide such a circuit in which both battery charging and transducer readout are accomplished at separate times in a non-interfering manner by means of a simple and inexpensive relay switching circuit.

The foregoing and other objects, features and advantages of the present invention will be apparent from the following more particular description of a preferred embodiment of the invention, as illustrated in the accompanying drawing in which the single figure shows a schematic circuit diagram of a combination battery charging and transducer readout circuit constructed in accordance with the teachings of this invention.

Referring now to the drawing, charging and monitoring are implemented by the constant current source 10 and readout device 12, respectively, which are selectively connected to the remote transducer unit 14 over a long-line, to conductor cable 16 through a double pole double throw switch 18. In a bore hole environment the constant current source 10, the readout device 12 and the swich 18 would be located at the surface while the cable 16 would extend down the bore hole to the transducer unit. The latter includes a transducer device 20, a storage battery 22 and a relay switching circuit. The switching circuit comprises relay coils 24 and 26, a conventional diode 28 and a Zener diode 30 connected in series across the conductors of cable 16. The coils 24 and 26 actuate single pole double throw switches 32 and 34, respectively, which connect the cable conductors across the battery in the position shown or across the transducer device output when in the dotted line or de-energized position.

In operation, when switch 18 is connected to the charging current source 10, as shown, current flows through the series path including the relay coils 24, 26 and the diodes 28, 30. The magnitude of the applied signal is sufficient to break down the Zener diode 30. With the relay coils thus energized, they actuate their associated switches 32 and 34 to connect the source 10 across the battery 22 through a diode 36. Under these conditions the battery is charged from the source 10 over cable 16. If a transducer reading is desired, the switch 18 is simply reversed to the dotted line position, which places the readout device 12 in the circuit and de-energizes the relay coils, allowing the switches 32 and 34 to connect the transducer device output lines to the conductors of cable 16. The Zener diode 30 reverts to its normal condition and now prevents any dissipation of the relatively low magnitude output signal through the relay coil path.

The source 10, readout device 12 and transducer device 20 may have any one of a number of specific forms well known in the art, not essential to this invention. The readout device may be a simple voltmeter or a strip recorder, for example, and the transducer device may sense any desired variable, such as temperature, pressure, flow rate, density, etc. Furthermore, a plurality of remote transducer units could be connected to the same cable. Channel separation in the readout device could then be effected by filtering techniques using transducers with A.C. outputs of different frequencies.

While the invention has been particularly shown and described with reference to a preferred embodiment thereof, it will be understood by those skilled in the art that various changes in form and details may be made therein without departing from the spirit and scope of the invention.

What is claimed is:
1. A storage device charging-readout circuit for a remote metering device, comprising:
    (a) a source charging current,
    (b) a readout device,
    (c) a long-line cable,
    (d) first means for selectively connecting the cable to the source or the readout device,
    (e) a remote transducer unit for sensing a variable parameter including a chargeable electric storage device connected to the input thereof and an output,
    (f) second means for connecting the cable to either the storage device or the output, and
    (g) means connected to the cable for actuating the second means to connect the cable to the storage device in response to the connncting of the cable to the source by the first means, and wherein the second means connects the cable to the transducer unit output when the first means connects the cable to the readout device.

2. A storage device charging-readout circuit as defined in claim 1 wherein the long-line cable has two conductors, the second means comprises a pair of single pole double throw switches having their common ends respectively connected to the two conductors, and the means recited in sub-paragraph (g) includes at least one relay coil for the switches connected in series between the two conductors.

3. A storage device charging-readout circuit as defined in claim 2 wherein the means recited in sub-paragraph (g) further includes a conventional diode and a Zener diode connected in series with the relay coils in directions of opposite polarity for preventing the output signal from the transducer unit from dissipating through the relay coils.

References Cited

UNITED STATES PATENTS 3,176,210  3/1965  Bethke _____ 320—48 X
3,215,922  11/1965  Olsen et al. _____ 320—40

JOHN F. COUCH, *Primary Examiner.*

S. WEINBERG, *Assistant Examiner.*